United States Patent
Dubois et al.

(10) Patent No.: US 8,263,036 B2
(45) Date of Patent: Sep. 11, 2012

(54) METHOD FOR MANUFACTURING NITRIC ACID

(75) Inventors: Jean-Luc Dubois, Millery (FR); Paul-Guillaume Schmitt, Billere (FR)

(73) Assignee: Arkema France, Colombes (FR)

( * ) Notice: Subject to any disclaimer, the term of this patent is extended or adjusted under 35 U.S.C. 154(b) by 90 days.

(21) Appl. No.: 12/865,870

(22) PCT Filed: Mar. 19, 2009

(86) PCT No.: PCT/FR2009/050464
§ 371 (c)(1),
(2), (4) Date: Sep. 8, 2010

(87) PCT Pub. No.: WO2009/122108
PCT Pub. Date: Oct. 8, 2009

(65) Prior Publication Data
US 2011/0002836 A1    Jan. 6, 2011

(30) Foreign Application Priority Data
Mar. 20, 2008 (FR) .................................. 08 51806

(51) Int. Cl.
*C01B 21/38* (2006.01)
(52) U.S. Cl. ..................................... 423/390.1; 423/392
(58) Field of Classification Search ............... 423/390.1, 423/392
See application file for complete search history.

(56) References Cited

U.S. PATENT DOCUMENTS

| | | | | |
|---|---|---|---|---|
| 1,756,532 | A | * | 4/1930 | Battegay .................. 423/390.1 |
| 1,868,868 | A | * | 7/1932 | Bahr ............................. 423/392 |
| 3,716,625 | A | * | 2/1973 | Oberste-Berghaus et al. ............................ 423/392 |
| 3,927,182 | A | * | 12/1975 | Powell ......................... 423/392 |
| 5,188,813 | A | * | 2/1993 | Fairey et al. .................. 423/403 |
| 6,451,278 | B1 | * | 9/2002 | Zolotarsky et al. ........... 423/403 |

OTHER PUBLICATIONS

Written Opinion of the International Searching Authority received in PCT/FR2009/050464, mailed Sep. 23, 2009. English translation provided.

International Search Report received in PCT/FR2009/050464, mailed Sep. 23, 2009. English translation provided.

Polyakov, M.V. (1951) "The Optimum Conditions in the Catalytic Oxidation of Ammonia" Database CA Chemical Abstracts Service. Abstract provided.

* cited by examiner

*Primary Examiner* — Timothy Vanoy
(74) *Attorney, Agent, or Firm* — Smith, Gambrell & Russell, LLP

(57) ABSTRACT

The present invention relates to a method for manufacturing nitric acid wherein a gaseous mixture, including air and ammonia, is transported on a catalyst including platinum to carry out catalytic oxidation of the ammonia, and is characterized in that a sulfurated component is added to the gaseous mixture.

19 Claims, No Drawings

METHOD FOR MANUFACTURING NITRIC ACID

FIELD OF THE INVENTION

The present invention relates to the manufacture of nitric acid and relates, in particular, to improving the yield of the nitric acid manufacturing process.

PRIOR ART

Nitric acid is mainly used for manufacturing nitrogen fertilizers and organic fertilizers, in the form of ammonium nitrate, potassium nitrate or nitrophosphate. Nitric acid is also used in explosives, the plastics industry and the chemical industry.

Nitric acid ($HNO_3$) is manufactured industrially by catalytic combustion of ammonia followed by an aqueous absorption of the nitrous gases formed. The synthesis of $HNO_3$ comprises three steps (Ostwald process):

the first step is an oxidation of the ammonia:

$$4NH_3 + 5 \rightarrow 4NO + 6H_2O \tag{1}$$

The ammonia oxidation step takes place in the presence of a platinum-based catalyst with yields of around 93-98% depending on the operating conditions used. The yield is here expressed as moles of NO produced over the number of moles of ammonia introduced.

the second step is a condensation of the water of combustion:

$$H_2O_{(gas)} \rightarrow H_2O_{(liquid)} \tag{2}$$

and an oxidation of the nitrogen monoxide:

$$2NO + O \rightleftharpoons 2NO_2 \rightleftharpoons N_2O_4 \tag{3}$$

the third step is an absorption or fixation of the nitrogen dioxide and tetroxide:

$$3NO_2 + H_2O \rightleftharpoons 2HNO_3 + NO \tag{4}$$

and $$N_2O_4 + \tfrac{1}{2}O_2 + H_2O \rightleftharpoons 2HNO_3 \tag{5}$$

Many processes have been developed and exploited since Ostwald developed, in 1908, in a first pilot plant, the step of catalytic combustion of ammonia for the production of nitric acid.

The catalyst used in current processes is generally formed by one or more platinum gauzes or else by a pack of fibers held between two gauzes. An alloy of platinum with 5 to 10% rhodium improves the mechanical strength, improves the yield and reduces the loss of activity of the catalyst. Palladium or iridium may also be used in the catalyst alloys. However, palladium improves the yield but lowers the mechanical strength, whilst iridium improves the mechanical strength but lowers the yield.

The current industrial processes are either single-pressure processes (catalytic combustion and absorption at the same pressure), or two-pressure processes (absorption pressure substantially greater than that of the catalytic combustion). The most widespread is the two-pressure process, which has, in particular, the advantage of consuming less platinum than the single-pressure process.

Whether they are single-pressure or two-pressure processes, the current processes are essentially differentiated by the preferential method of forming nitric acid, favoring either reaction (4) (process of the Grande Paroisse chemical company), or reaction (5) (SOLNOX process) of the Ostwald process described previously.

In the Case of the Processes of the Grande Paroisse Chemical Company

The two-pressure process is summarized as follows:

Liquid ammonia is vaporized by the cooling water, then filtered after superheating and sent to an air/ammonia mixer.

Filtered atmospheric air is compressed, then split into two streams, the primary air which goes to the air/ammonia mixer and the secondary air which goes into a denitrator.

The air/ammonia mixture is conveyed to a reactor where it flows from top to bottom. A special device ensures its distribution over the surface of platinum (in general platinum-rhodium) gauzes, which rest on special steel supports, generally in the shape of a ring.

The gas, after combustion, contains nitrogen oxides, nitrogen and oxygen. Its heat is recovered in heat exchangers (waste heat boiler).

After final cooling by the cooling water, a large amount of low-concentration acid is formed and sent to an absorption tower. The gas mixed with secondary air is compressed and cooled.

The gas and the acid are conveyed to the plates of the absorption column, which is equipped with cooling coils. Process water is introduced at the top and the acid, at the desired concentration, is withdrawn at its base.

This acid then goes to the denitrator equipped with plates. Steam stripping takes place with secondary air.

The gases exiting at the top of the absorber are sent to a gas/gas heat exchanger, then into an expansion turbine and finally to a stack.

The single-pressure process is summarized as follows:

In this process, condensation and absorption take place at the same pressure as the oxidation, between 5 and 10 bar approximately. This process therefore does not require the nitrous gases to be compressed, and the absorption tower may be equipped, in its lower part, with a denitration stage. As regards the rest of the installation, there are no substantial modifications with respect to the process described previously.

In the Case of the SOLNOX Process

In the case of the single-pressure process, the sole working pressure generally lies between 6 and 10 bar.

The process comprises three main steps:

1) Catalytic oxidation of the ammonia:

Air necessary for the formation of the acid, after compression in a compressor C and cooling in a first exchanger e1, enters at a temperature in the vicinity of 200° C. into a mixer which also receives, in suitable proportions, ammonia vaporized in a second heat exchanger e2.

After the intimate mixing thereof, the two gases pass over several platinum gauzes superposed in a catalysis furnace. The oxidation of the ammonia therein is almost instantaneous and the exothermicity of the reaction raises the temperature of the gas flow to more than 800° C.

The nitrous gases (NO essentially, diluted by nitrogen from the air and the water of reaction) pass into a waste heat boiler situated immediately after the catalysis furnace, then into a third heat exchanger e3 where they heat the tail gases and are cooled to a temperature slightly above their dew point.

2) Condensation of the water and oxidation of the nitrogen monoxide:

The nitrous gases containing all of the water of oxidation of the ammonia enter into a cooler consisting of a pre-cooler, the purpose of which is to condense most of the water, then into a special condenser (a parallel flow condenser) the purpose of which is to complete the condensation of the water and to oxidize NO to $NO_2$. During these operations, nitric acid is formed having a titer in the vicinity of 60% of $HNO_3$.

The special condenser receives a mixture of air and of $NO_2$, from a denitrator and from a reactor.

3) Dimerization of the nitrogen dioxide and formation of nitric acid:

The nitrous gases from the condenser cross a fourth heat exchanger e4 where they are cooled to 0° C. while heating the tail gases to around 20° C., then enter at the bottom of a plate column through which an 80% solution of nitric acid cooled to a temperature slightly below 0° C. travels from top to bottom. In this column, $NO_2$ dimerizes to $N_2O_4$ and dissolves in the acid.

At the outlet of this column, the nitrous gases which contain only very small amounts of nitrogen oxide $NO_x$, (around 200 ppm by volume) and that are referred to as tail gases, are heated successively by crossing the heat exchangers e4, e1 and e3. They finally expand in a power recovery turbine which provides around 70% of the energy requirements of the compressor.

The solution of nitric acid and of $N_2O_4$, after heating in a fifth heat exchanger e5, is introduced into a second denitrator which also receives air coming from the compressor C. This $NO_2$-enriched air is sent to a reactor at the same time as the 60% acid and as the reflux composed of $N_2O_4$ originating from a cooler situated over the reactor vent. It is in the latter reactor that the acid containing 80% $HNO_3$ forms.

After denitration, the flow of this 80% acid is separated into two parts: one returns to the circuit of the dissolution column (plate column), the other corresponds to the production of acid containing 73% $HNO_3$ (average of the productions of 60% and 80% acid provided by the single-pressure process).

There is also a two-pressure scheme for this process (not described here) which is particularly advantageous each time that it is desired to produce acid having an average titer greater than 73%, which may attain 98% of $HNO_3$.

In order to result in an economical optimum, all of the operating conditions of the processes for manufacturing $HNO_3$ described above must be optimized.

In particular, the yield of the oxidation step depends on several parameters such as the velocity of the gases, the composition of the catalyst (especially its age, its impurities, its rhodium content, its specific surface area), the operating conditions (temperature, pressure). The yield of the oxidation step also depends on the design of the distribution or mixing of the fluids.

Generally, the yield:
increases with the temperature in the customary operating zone, except at low regimes;
only depends on the $O_2/NH_3$ ratio when this deviates substantially from the value 1.75;
decreases with the pressure;
increases with the residence time, except at high temperatures;
increases with the purity of the catalyst and with its rhodium content (up to 10% preferably).

The yield increases especially by decreasing the flow rate of $NH_3$ and by operating at low pressure.

Such adjustments of the operating conditions already make it possible to obtain good yields with new catalysts, of the order of 93 to 98%, and little research has therefore been carried out to date in order to further improve these yields.

Indeed, in recent years, the research has instead concentrated on reducing releases of nitrogen oxides in order to respect regulations regarding pollution by nitrogen oxides $NO_x$, as is demonstrated by the number of patents filed relating to this subject.

However, considering the increase in the average size of nitric acid manufacturing units, even a minimal increase (that is to say from 1 to 5%) in the yield of the $HNO_3$ manufacturing process would have extremely advantageous consequences in terms of gains in productivity. Furthermore, since the activity of the catalysts decreases over time as a function of the usage conditions, the yield for the manufacture of $NHO_3$ has a tendency to also decrease with time. Thus, even if yields of the order of 93 to 98% are obtained with new catalysts, these yields have a tendency to drop with the usage time. In order to compensate for this loss of yield, the operators of a production unit are obliged to modify the operating parameters, in particular the temperature, residence time, $O_2/NH_3$ ratio, these having an impact on the productivities and on the overall profitability of this oxidation step. The advantage of a solution which would make it possible to increase the yield not only with a new catalyst but also with a used catalyst is therefore clear.

The objective of the present invention is therefore to provide a process for manufacturing nitric acid, having an improved yield, which makes a greater production capacity and/or lower production costs possible.

In particular, the objective of the present invention is to design a process for manufacturing nitric acid for which the yield approaches 100%, or is even substantially equal to 100%. The objective of the present invention is also to enable a longer service life of the catalyst while keeping the same high yield for longer, which makes it possible to improve the profitability of the production unit.

An objective of the present invention is also to provide a process for manufacturing nitric acid which is simple, rapid (comprising as few steps as possible), easy to implement, and which is easily adapted to the existing nitric acid manufacturing devices in the industry.

When 100% is not obtained during the oxidation step this is mainly linked to the thermal or catalytic decomposition of $NH_3$. Indeed, some of the ammonia introduced does not participate in the production of $HNO_3$, and
either decomposes to nitrogen and hydrogen according to the reaction:

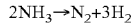

$$2NH_3 \rightarrow N_2 + 3H_2$$

or remains inert (by-pass).

The present invention therefore aims to reduce this thermal or catalytic decomposition of $NH_3$.

The reduction of the activity of the catalysts as a function of the usage time is mainly linked to the consumption of platinum, this consumption increasing with the temperature and the thermal shocks (shutdowns, startups) and with the pressure.

It is known from the prior art that the addition of sulfur-containing compounds inhibits the decomposition of $NH_3$. Yet, to date, the addition of sulfur-containing compounds has never been used for the production of $HNO_3$.

This is because sulfur-containing compounds are known for being poisons that are capable of inhibiting the activity of catalysts, such as platinum.

For this reason, a person skilled in the art has for a long time sought to avoid the presence of sulfur-containing compounds in the manufacture of nitric acid, as shown by the article "The Manufacture of Nitric Acid", extract from journal "Platinum Metals Rev., 1967, 11, (2), 60-69". Such sulfur-containing compounds may, for example, be found in the lubricants of the compressors used for liquefying ammonia. It is therefore generally recommended to reduce the amount of sulfur-containing compounds in the lubricant to 5 ppm. Likewise the ammonia, if it is from a non-synthetic source, may contain considerable amounts of sulfur, which should be previously removed so that the amount thereof does not exceed 1 or 2 ppm. Likewise, the air used for the oxidation of the ammonia is generally filtered in order to remove the gaseous impurities of $SO_2$ therefrom.

The applicant company has now found that, surprisingly, the addition of a sulfur-containing compound in a small amount during the nitric acid manufacturing process makes it possible to increase the yield of the manufacture of nitric acid, makes it possible to increase the service life of the platinum-based oxidation catalyst, and thus makes it possible to improve the profitability of the production unit.

This effect is particularly pronounced if the sulfur-containing compound is dimethyl disulfide (DMDS).

Indeed, unexpectedly, the addition of a certain amount of DMDS increases the yield of the oxidation reaction of ammonia both over a new catalyst and over a used catalyst. The overall yield of the process to $HNO_3$ is thus increased thereby.

SUMMARY OF THE INVENTION

More specifically, one subject of the present invention is therefore a process for manufacturing nitric acid in which a gas mixture comprising air and ammonia is passed over a catalyst comprising platinum in order to carry out the catalytic oxidation of the ammonia, and in which a sulfur-containing compound is added to the gas mixture.

The sulfur-containing compound is preferably dimethyl disulfide (DMDS).

Advantageously, said catalyst comprises at least one platinum gauze, the platinum preferably being rhodium-plated in order to form a Pt—Rh alloy.

Advantageously, the sulfur-containing compound is added to the gas mixture before it passes over the catalyst.

Advantageously, the sulfur-containing compound is added to the gas mixture by injection at at least one injection point.

Advantageously, the sulfur-containing compound comprises at least one of the following compounds: elemental sulfur, carbon sulfide, mercaptan, hydrogen sulfide, thiophene compound, sulfide, disulfide, dialkyl sulfide, dimethyl sulfide.

Advantageously, the sulfur-containing compound comprises at least one organic polysulfide of formula:

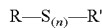

where n is an integer from 2 to 20 and where the radicals R and R', which are identical or different, each represent an organic radical each containing 1 to 150 carbon atoms per molecule, these radicals being chosen from the group constituted by naphthenic type or linear or branched, saturated or unsaturated, alkyl radicals, aryl radicals, alkylaryl radicals and arylalkyl radicals, R' possibly also representing a hydrogen atom.

Advantageously, the sulfur-containing compound is dimethyl disulfide or DMDS.

Advantageously, the sulfur-containing compound is added to the air upstream of the mixing with ammonia and/or is added to the ammonia upstream of the mixing with air, and/or is added to the air/ammonia gas mixture.

Advantageously, the temperature of the gas mixture at an injection point is within the range extending from 100° C. to 500° C., preferably in the range extending from 150° C. to 250° C.

Advantageously, the gas mixture comprising said sulfur-containing compound is brought to a temperature within the range extending from 800° C. to 1000° C., preferably from 820° C. to 940° C. during the catalytic oxidation of the ammonia.

Advantageously, the gas mixture comprising said sulfur-containing compound is brought to a pressure of around 3 to 10 bar during the catalytic oxidation of the ammonia.

Advantageously, the flow rate of the gas mixture comprising said sulfur-containing compound is adjusted so that its residence time is within the range extending from $10^{-3}$ s to $10^{-4}$ s during the catalytic oxidation of the ammonia.

Advantageously, the amount of sulfur-containing compound added to the gas mixture is within the range extending from 5 to 500 ppm expressed as volume of sulfur relative to the volume of $NH_3$ introduced in the process, and preferably within the range extending from 10 to 100 ppm expressed as volume of sulfur relative to the volume of $NH_3$ introduced in the process.

Advantageously, the sulfur-containing compound is injected continuously into the gas mixture.

Advantageously, one or more sulfur-containing compounds from the step of catalytic oxidation of the ammonia are withdrawn from the gas mixture, after said sulfur-containing compound has passed over said oxidation catalyst.

Another subject of the present invention is the use of a sulfur-containing compound in an effective amount in a process for manufacturing nitric acid by catalytic oxidation of ammonia, in order to increase the yield of said process.

DETAILED DESCRIPTION

As non-limiting examples of processes for which the yield may be improved owing to the process of the invention, mention may especially be made of those described previously, that is to say, for example, those of the Grande Paroisse chemical company and also the SOLNOX processes. It goes without saying that the process of the invention may also be used for increasing the yield of any other type of process for manufacturing nitric acid.

The nitric acid manufacturing process of the present invention is characterized in that it comprises the addition of a certain amount of sulfur-containing compound. The sulfur-containing compound may be of any type and may comprise carbon sulfide, mercaptans, hydrogen sulfide, thiophene compounds, sulfides, disulfides, dialkyl sulfides, especially dimethyl sulfide DMS or dimethyl disulfide DMDS or else a mixture of one or more of these compounds.

The sulfur-containing compound may comprise elemental sulfur, for example as powder (flower of sulfur) or else a mixture of elemental sulfur and of at least one organic polysulfide of formula: $R-S_{(n)}-R'$ where n is an integer from 2 to 20 and where the radicals R and R', which are identical or different, each represent an organic radical each containing 1 to 150 carbon atoms per molecule, these radicals being chosen from the group constituted by naphthenic type or linear or branched, saturated or unsaturated, alkyl radicals, aryl radicals, alkylaryl radicals and arylalkyl radicals, R' possibly also representing a hydrogen atom. As an example of a polysulfide, mention may be made of di-tert-dodecyl polysulfide (n=5) and di-tert-nonyl polysulfide (n=5).

When use is made of powdered sulfur (flower of sulfur) the latter is then used in suspension alone or as a mixture with another sulfur-containing compound (for example an organic polysulfide as defined above), with, in proportions for example by weight, 5 to 90% of polysulfide and 95 to 10% of elemental sulfur, more particularly, still by way of non-limiting example, 20 to 50% of polysulfide and 80 to 50% of elemental sulfur.

The process according to the invention preferably uses dimethyl disulfide.

The dimethyl disulfide of formula $H_3C—S—S—CH_3$, hereinafter denoted by DMDS, which may also be called methyl dithiomethane, is used in a large number of applications. DMDS is especially used as a sulfiding or pre-sulfiding agent in refineries in order to activate hydrotreatment catalysts. DMDS is also used in the petrochemical industry for protecting the steam-cracking circuits from the formation of coke and of carbon monoxide. It may also be used as a synthesis intermediate in fine chemistry or in metallurgy for its anti-corrosion properties.

Dimethyl disulfide (DMDS) is a widely available product; it is sold, in particular, by ARKEMA.

Until now, DMDS has never been used in a process for producing nitric acid. Its effect in the present invention is quite unexpected, since it goes against the widespread prejudice according to which sulfur-containing compounds are unfavorable to the manufacture of nitric acid. Without the applicant being tied to any one explanation, it may be that under the operating conditions of the process for manufacturing $HNO_3$, DMDS decomposes into various chemical species which are in equilibrium due to their short residence times in the installation, improving the efficiency of the catalyst, the yield of nitric acid and reducing the loss of ammonia by decomposition.

One subject of the present invention is a process for producing nitric acid in which a gas mixture comprising ammonia, air and optionally oxygen is passed over a catalyst composed of a rhodium-plated platinum gauze, and in which a sulfur-containing compound, preferably DMDS, is added to the gas mixture.

The sulfur-containing compound, for example DMDS, may be added by mixing with air before mixing with the ammonia. DMDS may also be added to the ammonia before mixing with the air. DMDS may else be added directly into the air/ammonia mixture. According to the process of the invention, it is possible to use a single one of these addition possibilities or else to combine two or three of these different possibilities for adding the sulfur-containing compound. The sulfur-containing compound may be added by injection at one or more injection points of the process. The temperature at the injection point depends on the flow used for the injection. In general, the temperature of the gas mixture at a sulfur-containing compound injection point is of the order of 100° C. to 500° C., preferably of the order of 150° C. to 250° C. The gas mixture to which the sulfur-containing compound is thus added is then brought to the reaction temperature of the oxidation step, that is to say to a temperature of the order of 820° C. to 940° C. Typically, during this oxidation step, the pressures are within the range extending from 3 to 10 bar and the flow rates are adjusted in order to have residence times of the order of $10^{-3}$ to $10^{-4}$ s.

DMDS may be added continuously in order to maintain an optimum level of sulfur.

DMDS is preferably added to the gas mixture, either into the air (optionally to which oxygen is added) upstream of the mixing with $NH_3$, or into the $NH_3$ upstream of the mixing with the air, or directly into the air/$NH_3$ gas mixture, preferably at a single injection point located on the device of the process. The addition of DMDS preferably takes place during the normal course of the reaction although it is also possible to add it during the step of activation of the catalyst (24 to 48 hours approximately). The amounts of DMDS injected into the gas mixture range from 5 to 500 ppm expressed as volume of sulfur relative to the volume of $NH_3$ introduced into the unit, and preferably from 10 to 100 ppm expressed as volume of sulfur relative to the volume of $NH_3$ introduced into the production unit. DMDS is preferably injected continuously.

Of course, the sulfur-containing compound crossing the platinum catalyst may not remain intact and may decompose to other sulfur-containing compounds. Advantageously, the process of the invention may comprise the withdrawal or the recovery of the sulfur-containing compound(s) downstream of the oxidation step. This allows possible interactions of the sulfur with other catalysts used in the remainder of the process to be avoided. In particular, catalysts used for carrying out the catalytic decomposition of $N_2O$ are sometimes placed downstream of the Pt—Rh gauzes or directly replace the customary ring for supporting the Pt—Rh gauzes in the device of the process. The contact of these $N_2O$ decomposition catalysts with sulfur-containing compounds could indeed be prejudicial thereto. By way of example of $N_2O$ decomposition catalysts, mention may be made of cobalt oxide spinels, those using magnesium oxide or zirconium dioxide, as an alloy with iron or else a mixture of $ZrO_2$ and $Al_2O_3$ impregnated with a zirconium salt, etc. Preferably, in this case, the sulfur-containing compounds from the oxidation step are therefore removed by any possible means during the process. Sulfur-containing compounds are thus prevented from passing into the remainder of the device of the process which is not dedicated to the oxidation of ammonia, and where the activity of such sulfur-containing compounds, in addition to being unnecessary, may be harmful.

All the other parameters being kept constant (constant purities of the raw materials, constant $O_2/NH_3$ molar ratio, constant temperature, constant pressure, constant residence time, etc.), the effect of DMDS in the process of the invention is expressed by an increase in the yield of the oxidation step of $NH_3$ of 1 to 5%. Given that the step of absorption of nitrous oxides in order to form $HNO_3$ takes place with a yield close to 100%, the increase in the yield of the ammonia oxidation step of between 1 and 5% is expressed directly by a similar gain in the overall yield of the $HNO_3$ synthesis.

DMDS is a non-toxic liquid product which may be easily vaporized under the conditions of the process (boiling point of around 110° C.). It makes it possible to significantly improve the productivity of the new or used catalyst employed without requiring an additional step of purification of the final product. The product obtained according to the process of the invention is free of sulfur-containing compounds, which allows it to be used directly in any subsequent process.

This gain in the yield observed with used catalysts indicates that these catalysts may be used over a substantially longer time before being changed. Whether it is a new or regenerated catalyst, the addition of DMDS according to the process of the invention increases the half-life of the catalyst.

The following examples illustrate the present invention without however limiting the scope thereof.

Comparative Example 1

The pilot plant for synthesis of nitric acid that was used operates with the following operating parameters:
Flow rate of the air/$NH_3$ mixture=70 $Nm^3/h$
Pressure=7.5 bar
T=920° C.
Used industrial gauzes of Pt/Rh catalyst
Concentration of $NH_3$ in the air/$NH_3$ mixture=10.5%

After startup of the installation, a stabilization period of 4 days is observed in order to obtain a reference yield of the NH$_3$ oxidation step.

Example 1

Under the same conditions as indicated in Example 1, DMDS is added directly to the air/NH$_3$ mixture at 150° C. by means of a metering pump with mass flow rates varying from 0.3 to 5 g/h. A stabilization period of one day is observed between each increase in the flow rate of DMDS before measuring the yield of the oxidation step.

In the case of Example 1, a yield of the oxidation step greater than that of the Comparative Example 1 is observed.

The invention claimed is:

1. A process for manufacturing nitric acid in which a gas mixture comprising air and ammonia is passed over a catalyst comprising platinum in order to carry out the catalytic oxidation of the ammonia, wherein a sulfur-containing compound is added to the gas mixture.

2. The process as claimed in claim 1, in which said catalyst comprises at least one platinum gauze.

3. The process as claimed in claim 1, in which the sulfur-containing compound is added to the gas mixture before it passes over said oxidation catalyst.

4. The process as claimed in claim 1, in which the sulfur-containing compound is added to the gas mixture by injection at least one injection point.

5. The process as claimed in claim 1, in which the sulfur-containing compound comprises at least one of the following compounds: elemental sulfur, carbon sulfide, mercaptan, hydrogen sulfide, thiophene compound, sulfide, disulfide, dialkyl sulfide, dimethyl sulfide and/or mixtures thereof.

6. The process as claimed in claim 1, in which the sulfur-containing compound comprises at least one organic polysulfide of formula:

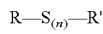

R—S$_{(n)}$—R' where n is an integer from 2 to 20 and where the radicals R and R', which are identical or different, each represent an organic radical each containing 1 to 150 carbon atoms per molecule, these radicals being chosen from the group constituted by naphthenic type or linear or branched, saturated or unsaturated, alkyl radicals, aryl radicals, alkylaryl radicals and arylalkyl radicals, R' possibly also representing a hydrogen atom.

7. The process as claimed claim 1, in which the sulfur-containing compound comprises dimethyl disulfide.

8. The process as claimed in claim 1, in which the sulfur-containing compound is added to the air upstream of the mixing with ammonia and/or is added to the ammonia upstream of the mixing with air, and/or is added to the air/ammonia gas mixture.

9. The process as claimed in claim 4, in which the temperature of the gas mixture at an injection point is within the range extending from 100° C. to 500° C.

10. The process as claimed in claim 1, in which the gas mixture comprising said sulfur-containing compound is brought to a temperature within the range extending from 800° C. to 1000° C. during the catalytic oxidation of the ammonia.

11. The process as claimed in claim 1, in which the gas mixture comprising said sulfur-containing compound is brought to a pressure of around 3 to 10 bar during the catalytic oxidation of the ammonia.

12. The process as claimed in claim 1, in which the flow rate of the gas mixture comprising said sulfur-containing compound is adjusted so that its residence time is within the range extending from s to s during the catalytic oxidation of the ammonia.

13. The process as claimed in claim 1, in which the amount of sulfur-containing compound added to the gas mixture is within the range extending from 5 to 500 ppm expressed as volume of sulfur relative to the volume of NH$_3$ introduced in the process, and preferably within the range extending from 10 to 100 ppm expressed as volume of sulfur relative to the volume of NH$_3$ introduced in the process.

14. The process as claimed in claim 1, in which the sulfur-containing compound is injected continuously into the gas mixture.

15. The process as claimed in claim 1, in which one or more sulfur-containing compounds from the step of catalytic oxidation of the ammonia are withdrawn from the gas mixture.

16. A method of increasing the yield of a process for manufacturing nitric acid by catalytic oxidation of ammonia which comprises adding a sulfur-containing compound to a gas mixture comprising air and ammonia that is passed over a catalyst comprising platinum in order to carry out the catalytic oxidation of the ammonia.

17. The process as claimed in claim 2, wherein the platinum gauze is rhodium-plated.

18. The process as claimed in claim 4, in which the temperature of the gas mixture at an injection point is within the range extending from 150° C. to 250° C.

19. The process as claimed in claim 1, in which the gas mixture comprising said sulfur-containing compound is brought to a temperature within the range extending from 820° C. to 940° C. during the catalytic oxidation of the ammonia.

* * * * *